July 23, 1935.  J. GOGAN  2,009,315
HARDNESS TESTING MACHINE
Filed May 19, 1932  3 Sheets-Sheet 2
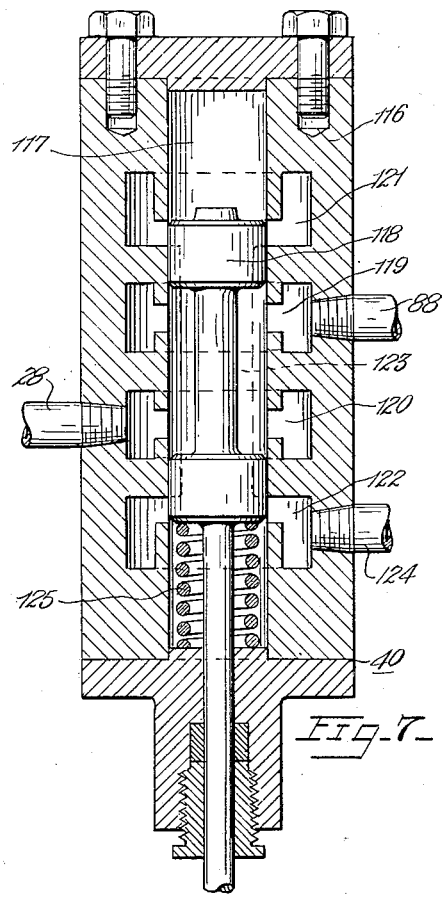
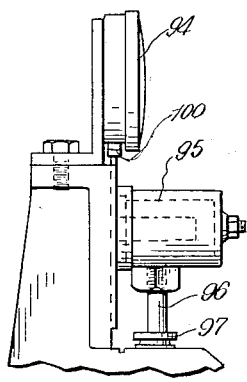
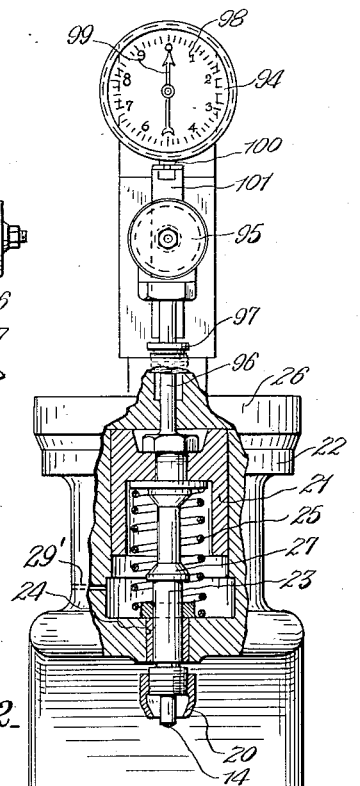
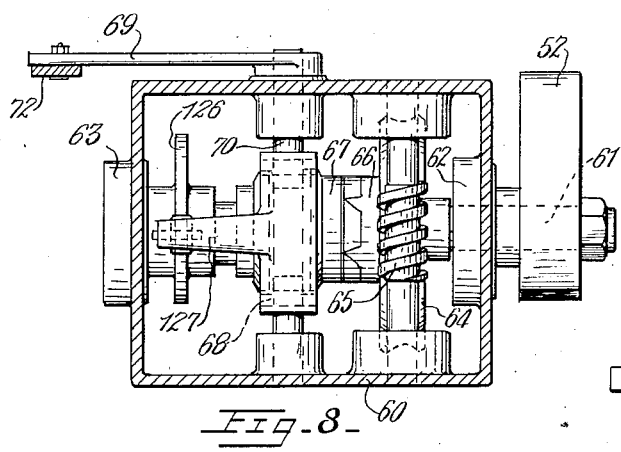
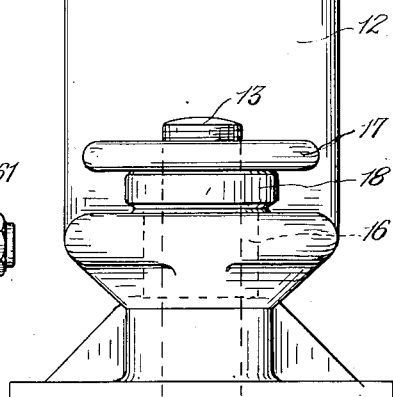
Inventor
JOSEPH GOGAN
ATTORNEYS July 23, 1935.  J. GOGAN  2,009,315
HARDNESS TESTING MACHINE
Filed May 19, 1932  3 Sheets-Sheet 3
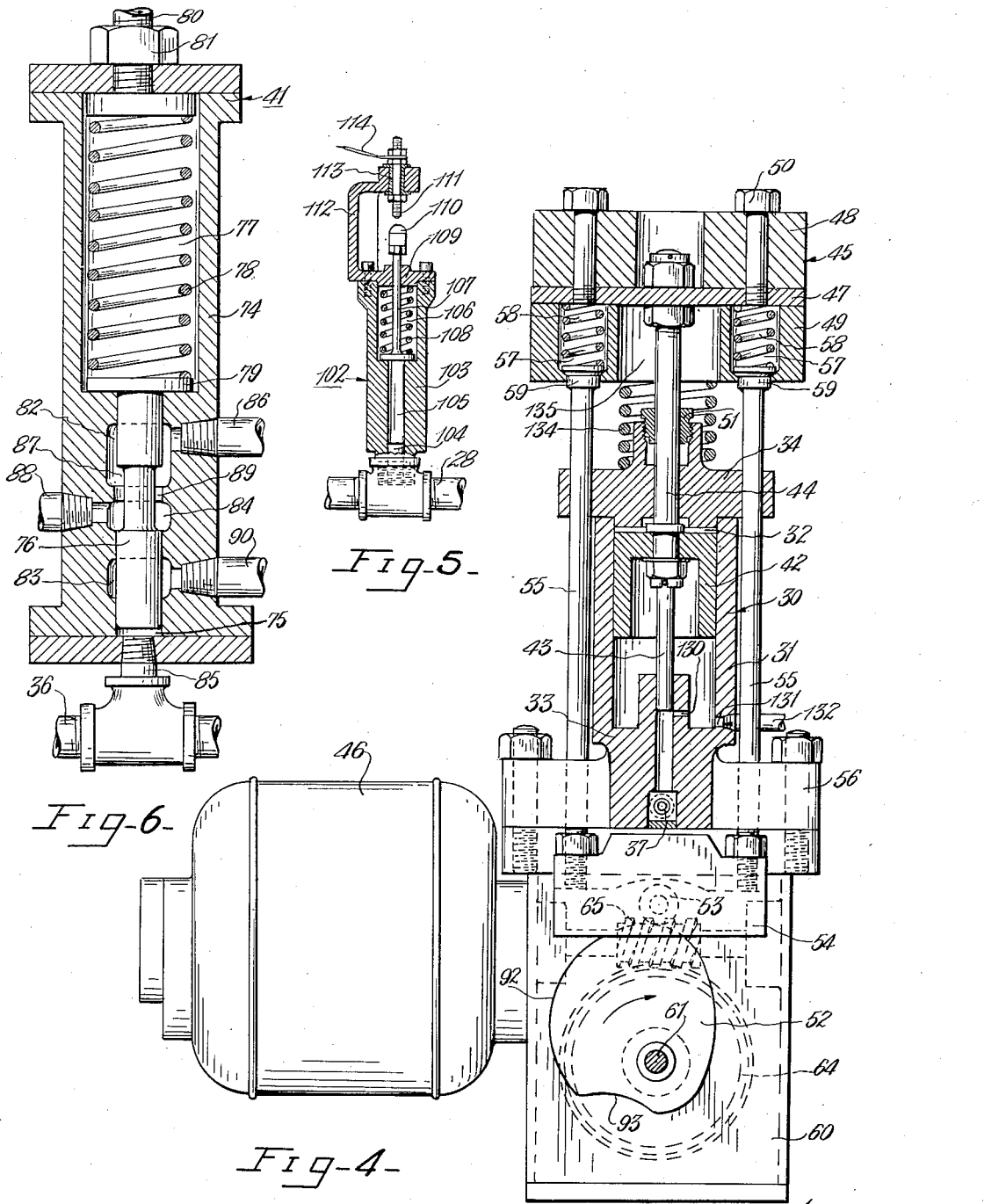
Inventor,
JOSEPH GOGAN
ATTORNEYS Patented July 23, 1935

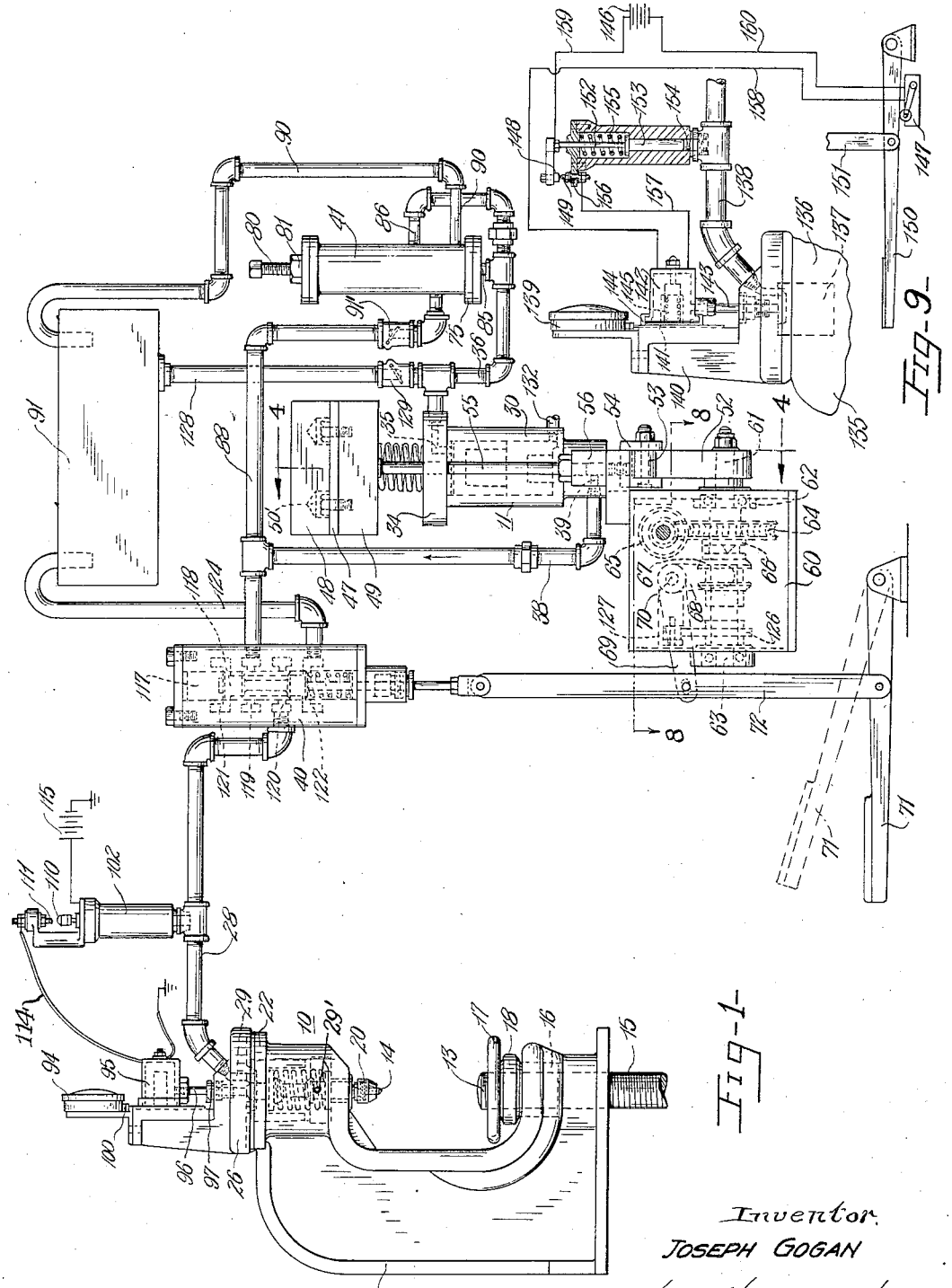

2,009,315

UNITED STATES PATENT OFFICE 2,009,315

HARDNESS TESTING MACHINE

Joseph Gogan, Cleveland, Ohio

Application May 19, 1932, Serial No. 612,245

24 Claims. (Cl. 265—14)

This invention relates to material testing apparatus, and more particularly to an improved and simplified form of machine for rapidly and accurately testing the hardness or other characteristics of individual bodies.

An object of my invention is to provide an improved form of testing machine of the type embodying means for measuring distortion produced in a test piece by a predetermined force, and wherein the predetermined force is derived from novel power means embodying a movable weight.

Another object of my invention is to provide an improved testing machine of the type referred to, wherein novel means is employed for measuring the distortion produced in the test piece.

A further object of my invention is to provide an improved testing machine having a contact member, which is initially moved into engagement with a test piece at a relatively rapid rate by a preliminary supply of motive fluid and is thereafter actuated at a relatively slow rate by a subsequent supply of fluid to distort the test piece, and wherein means is employed for preventing the pressure of the preliminary supply from exceeding a predetermined value.

Still another object of my invention is to provide an improved testing machine of the type referred to, wherein the supply of motive fluid during distortion of the test piece is obtained by movement of a weight, and wherein the movement of the weight is controlled by novel means to thereby regulate the velocity of movement of the distorting member.

The invention may be further briefly summarized as consisting in certain novel combinations and arrangements of parts hereinafter described and particularly set out in the appended claims.

In the accompanying sheets of drawings,

Fig. 1 is an elevational view of testing apparatus embodying my invention.

Fig. 2 is a front elevational view of the force applying and distortion measuring means with parts thereof broken away.

Fig. 3 is a partial side elevational view showing the distortion measuring means.

Fig. 4 is a sectional elevation taken substantially on line 4—4 of Fig. 1.

Fig. 5 is a central sectional elevation taken through the electrical contact means of the distortion measuring device.

Fig. 6 is a sectional elevation taken through the pressure regulating means.

Fig. 7 is a central sectional elevation taken through the motive fluid control valve.

Fig. 8 is a sectional plan view taken substantially on line 8—8 of Fig. 1, and

Fig. 9 is an elevational view, partly in section showing another form of control for the distortion measuring means.

Detailed reference will now be made to the accompanying drawings wherein I have illustrated an improved and simplified form of material testing apparatus, and although in disclosing my invention I have referred to this apparatus as a hardness tester, it should be understood that my invention may be embodied in various other structural arrangements and in apparatus for testing characteristics of material other than hardness.

In general, the testing apparatus of my invention is of the type wherein means is provided for accurately measuring distortion produced in a test piece by applying a predetermined force thereto and, as shown in Fig. 1, the preferred form of this apparatus includes a fluid pressure actuated device 10 for applying the force to the test piece and measuring the resulting distortion, and a pressure fluid supply device 11.

As illustrated in this instance, the device 10 is provided with a suitable frame 12 having an adjustable work support or mandrel 13, and a distorting member 14 for movement into engagement with a test piece held upon the support. The adjustable work support may be in the form of a screw 15 which extends through a threaded member 16 of the frame. The screw may be rotated by a wheel 17, and may be locked in different positions of adjustment by suitable means such as the lock nut 18.

The distorting member 14, which may also be referred to as a contact member or an impression member, is arranged above the mandrel 13, preferably in direct axial alignment therewith, and is adapted for movement toward and away from the mandrel. This distorting member is preferably in the form of a body of hard material, such as the diamond pointed member illustrated in this instance, but may be of any other desired form, such as the hardened steel ball used in making a Brinell test. As shown in Fig. 2, the impression member may be mounted in a suitable holder such as the chuck 20, and is adapted to be moved toward the mandrel 13 by fluid pressure acting against the piston 21. This piston is reciprocably mounted in a power cylinder 22 and is connected with the impression member by a piston rod 23 which extends through the guide member 24. A coil spring 25, disposed in the power cylinder and around the piston rod, normally tends to move the impression member upwardly away from the mandrel, and at all times opposes the pressure of the fluid acting upon the piston. If desired, upward movement of the piston under the action of the spring may be limited by the engagement of the top of the piston with the cylinder cover 26, and downward movement of the impression member under the action of the fluid may be limited by a suitable stop 27, provided on the piston rod. Motive fluid, such as a suitable oil, under pressure, may be supplied to the power cylinder from the fluid pressure supply device 11 by means of a conduit 28 which communicates with the power cylinder through a passage 29 provided in the cover 26. The cylinder 22 may be vented to atmosphere below the piston 21 therein as by providing the cylinder with a suitable vent opening 29'.

The fluid pressure supply device 11 is constructed in the form of a pump 30 which, as shown in Figs. 1 and 4 of the drawings, is provided with a body or casing 31 having a fluid supply cylinder 32 of relatively large diameter therein, and also having a fluid supply cylinder 33 of relatively small diameter. The cylinder 32 is provided with a cover 34 having a fluid discharge passage 35 therein which communicates with the fluid delivery conduit 36. The cylinder 33 is provided at the lower end thereof with a discharge chamber 37 which communicates with the delivery conduit 38 through the passage 39. As will be explained hereinafter, the fluid delivered into the conduits 36 and 38 from the cylinders 32 and 33, is supplied to the power cylinder 22 through a control valve 40, the pressure of the fluid delivered by the supply cylinder 32 being prevented by a regulating device 41 from exceeding a predetermined value.

For delivering motive fluid into the conduits 36 and 38 from the cylinders 32 and 33, I provide the pump 30 with a plunger 42 of relatively large diameter which is reciprocable in the cylinder 32, and a plunger 43 of relatively small diameter which is reciprocable in the cylinder 33. As shown in Fig. 4 of the drawings, the cylinders 32 and 33 are preferably arranged in coaxial relation in the body 31 so that the plunger 43 may be in tandem to the plunger 42. In this instance the plunger 43 is constructed as an extension of the operating rod 44 of the plunger 42. For actuating the plungers of the pump in their respective cylinders, I provide actuating means which includes a weight 45 for causing a downward power stroke of the plunger 43 in its cylinder, and which also includes an electric motor 46 for lifting the weight against the action of gravity and at the same time causing an upward power stroke of the plunger 42 in its cylinder. The weight itself may be of any suitable form and, as herein shown, comprises a plate 47, and a plurality of sections 48 and 49 which are connected to the plate by suitable bolts 50 and 50'. The plate is connected with the plunger 42 and with the plunger 43 by means of the operating rod 44 which extends through the cover 34 and through the packing gland 51.

For lifting the weight 45, and at the same time causing a power stroke of the plunger 42, I provide a cam 52 which is driven by the motor 46, and which imparts movement to the weight through the cam follower 53. This cam follower is preferably in the form of a roller which is mounted in the movable yoke 54. This yoke, as shown in Figs. 1 and 4 of the drawings, is connected with the weight 45 by means of a pair of push rods 55 which extend through, and may be guided in, the cover 34 and in the laterally extending clamping portions 56 of the pump casing. These push rods may be connected to the weight by any suitable means, but I prefer to employ a flexible connection therebetween by providing the weight section 49 with recesses 57 having compression springs 58 therein for engagement with the heads 59 of the push rods.

As a means of driving the cam 52 from the motor 46, I provide a transmission casing 60 having a drive shaft 61 extending therefrom to which the cam is keyed or otherwise secured. This drive shaft extends transversely of the transmission casing, which may contain a body of lubricant such as oil, and is rotatably supported in the casing by suitable bearings 62 and 63. A worm gear 64 is rotatably supported on the drive shaft and is driven from the electric motor by the worm 65. This worm gear is provided with a clutch element 66 with which the shiftable clutch element 67 may cooperate. The shiftable clutch element is splined to the drive shaft, and may be moved into or out of driving engagement with the clutch element 66 by means of a shifting fork 68 which is actuated by the lever 69 through the rock shaft 70. The lever 69 may be actuated from a suitable manual control, such as the pedal 71, through the link 72 to which the lever and pedal are pivotally connected.

From the arrangement just described it will be seen that when the shiftable clutch element 67 is moved into engagement with the clutch element 66 by depressing the pedal 71 to the position shown in full line in Fig. 1, the cam 52 will be rotated in a clockwise direction. Such rotation of the cam causes the weight 45 to be lifted, and at the same time moves the large plunger 42 upwardly in the cylinder 32 to force motive fluid into the delivery conduit 36. Continued rotation of the cam allows the weight to descend thereby causing the plunger 43 to travel downwardly in the cylinder 33 and force motive fluid into the delivery conduit 38.

The fluid supply plunger 42 and the power piston 21 are so proportioned relative to each other and to the coil spring 25, that a relatively large volume of motive fluid will be supplied to the power cylinder 22 from the cylinder 32 at a relatively low pressure to cause an initial rapid movement of the impression member 14 downwardly into contact with the piece to be tested. This initial rapid movement of the impression member is desirable so as to quickly bring this member into position for making a test. It is desirable, however, that the pressure of this preliminary supply of motive fluid should not cause penetration or distortion of the test piece by the member 14. Accordingly, to prevent the pressure of the preliminary supply of motive fluid from exceeding a predetermined value, I employ the pressure regulating device 41 which, in this instance, is so constructed and arranged that the preliminary supply of motive fluid must pass therethrough.

As shown in Figs. 1 and 6 of the drawings, the pressure regulating device 41 is provided with a casing 74 having a cylinder 75 therein, and a plunger 76 which is reciprocable in this cylinder. The cylinder is formed with an enlarged upper chamber 77 into which the plunger extends. A compression spring 78 engages the upper end of the plunger and normally tends to move the latter downwardly. If desired, the upper end of the plunger may be enlarged to form the spring plate 78 which also functions as a stop for limiting the downward movement of the plunger in the cylinder. The compression of the spring 78 may be regulated by means of an adjusting screw 80 which may be clamped in desired positions of adjustment by means of the locking nut 81.

The cylinder 75 of the pressure regulating device is provided with a pair of ports 82 and 83, which are spaced apart in the axial direction of the cylinder, and with a port 84 which is disposed intermediate the ports 82 and 83. Fluid delivered into the conduit 36 from the cylinder 32 is supplied to the cylinder 75, at the bottom thereof through the connection 85, and to the port 82 through the conduit 86. The port 82 normally communicates with the port 84 through an annular groove or recess 87 formed in the surface of the plunger to thereby connect the conduit 86 with the valve 40 through the conduit 88. Intermediate the ports 82 and 84 the inner surface of the cylinder 75 is provided with an annular seat portion 89 which cooperates with the outer surface of the plunger in the manner of a valve when fluid pressure acting against the bottom of the plunger has moved the latter upwardly against the action of the spring 78. The port 83 communicates with a conduit 90 which leads to a fluid reservoir 91. The port 83 is separated from the port 84 by the plunger 76, but is connected with the conduit 85 when the pressure of the fluid in the conduit 36 is sufficient to raise the plunger against the action of the spring 78.

It will be seen from the arrangement just described that when the preliminary supply of motive fluid is delivered into the conduit 36 from the cylinder 32 this fluid will normally pass through the conduit 86 and the ports 82 and 84 for delivery to the power cylinder 22 through the conduits 88 and 28. The pressure of this preliminary fluid supply always acts on the plunger 76, by reason of the connection 85 to the bottom of the cylinder 75, and if the pressure of the fluid exceeds a definite desired value, as determined by the setting of the adjusting screw 80, the plunger 76 will be moved upwardly to close the communicating passage between the ports 82 and 84 and to place the cylinder 75 in communication with the port 83. The closing of the passage between the ports 82 and 84 prevents further flow of fluid to the power cylinder, while the connection of the port 83 with the cylinder 75 places the latter and the conduit 36 in communication with the reservoir through the conduit 90.

When the cam 52 has been moved to the position shown in Fig. 4, the power stroke of the plunger 42 has been completed and further rotation of the cam allows the plunger 43 to be moved downwardly by the weight 45. The motive fluid thus delivered into the conduit 38 by the downward movement of the plunger 43, is supplied to the power cylinder 22 through the conduit 28 at a relatively high pressure as compared with the pressure of the preliminary fluid supply. The pressure of this subsequent motive fluid supply is dependent upon the resistance of the test piece to distortion by the member 14, upon the cross-sectional area of the plunger 43, and upon the mass of the weight 45. This subsequent supply of motive fluid causes the member 14, which has already been moved into engagement with the test piece, to be pressed into, or otherwise distort, the piece supported upon the mandrel 13. To prevent the increased fluid pressure, delivered into the conduit 38 by the cylinder 33, from escaping to the reservoir through the regulating device 41, I employ a suitable check valve 91' in the conduit 88.

In testing material for hardness, or other characteristics, it is desirable that the distortion of the piece being tested take place at a relatively slow but uniform rate, and in my improved testing apparatus I obtain the desired slow movement of the member 14 during the distortion of the test piece, by reason of the relatively small diameter of the plunger 43 as compared with the diameter of the piston 21, and by controlling the rate of downward movement of the weight 45. To prevent downward movement of the weight 45 at a rate which is too rapid for accurate determination, I design the cam 52 with a surface 92 of such curvature that the weight will descend at a uniform rate as the cam is rotated. Should the material being tested be relatively soft, the curved surface 92 of the cam will retard the downward movement of the weight and will prevent the member 14 from distorting the material at a rate too rapid for accuracy. As the cam continues to rotate, the full load of the weight is ultimately imposed upon the fluid and is transmitted to the power cylinder 22, and when the member 14 has caused the material being tested to be distorted an amount corresponding with the predetermined pressure applied by the weight, the cam surface moves away from the follower 53 and the weight ceases to descend. If desired, the cam may be provided with a recess 93 to insure the full load of the weight being imposed upon fluid in the cylinder 33 and the full value of the corresponding predetermined pressure being transmitted to the member 14.

For accurately measuring the distortion produced in the test piece by the distorting member 14, I provide an indicator preferably in the form of a depth gauge 94, which is mounted upon the frame 12, and which is rendered responsive to movement of the distorting member by electromagnetic means which I will now describe. This electromagnetic means includes an electromagnet 95 which is connected for movement with the piston 21 as by means of a rod 96 extending through the packing gland 97 of the cylinder cover 26. The gauge 94 may be of any suitable form of construction, but is preferably of the type having a series of characters or indications 98, and a pointer 99 which is moved in opposition to a spring contained in the casing of the gauge by an outwardly projecting stem or actuating member 100. A magnetizable member 101, preferably of elongated relatively flat form is connected to the actuating member 100 and extends downwardly past the electromagnet 95. When the electromagnet is energized the member 101 is attracted and held against the electromagnet, thereby connecting the gauge actuating member 100 with the impression member 14.

As a means of energizing the electromagnet 95 at the proper time, I provide an electric contact device 102 which is actuated by the pressure of fluid being supplied to the power cylinder 22. As shown in Figs. 1 and 5 of the drawings, this electric contact device comprises a body 103 having a cylinder 104 therein which communicates with the conduit 28, and a plunger 105 which is reciprocably mounted in the cylinder. The body 103 is also provided with a chamber 106 through which the stem 107 of the plunger is extended. A spring 108, disposed in the chamber 106 around the stem 107, normally tends to move the plunger downwardly in opposition to the pressure of the motive fluid. The stem 107 extends upwardly through the cover 109 and is provided at its upper end with a contact 110 which engages a stationary contact 111 when the plunger is moved upwardly against the action of the spring 108. The contact 111 is mounted in the bracket 112 of the cover 109 but is insulated therefrom as by means of an insulating bushing 113. The contact 111 is connected with one end of the winding of the electromagnet 95 by means of the conductor 114, while the contact 110 is connected with a source of suitable energizing current, such as the storage battery 115.

In the operation of my improved testing machine, it is desirable that the gauge 94 be operably connected with the member 14 after the latter has been moved into engagement with the material to be tested, but prior to the beginning of the distorting movement of this member. Accordingly, the cross-sectional area of the plunger 105 and the spring 108 are so proportioned that the plunger will be actuated by a pressure value of the preliminary motive fluid supply which is only slightly in excess of the pressure value of this fluid required to move the member 14 into engagement with the test piece. In other words, the plunger 105 and the spring 108 are so proportioned that the plunger will be moved upwardly against the action of the spring immediately after the member 14 engages the test piece. This upward movement of the plunger causes the contact 110 to engage the contact 111 so that the electromagnet 95 will be energized by current supplied by the battery 115.

For controlling the supply of motive fluid to the power cylinder 22 from the pump 30, I employ the control valve 40 which may be of any suitable construction. In this instance the control valve is shown as being of the balanced piston type comprising a valve casing 116 having a valve cylinder 117 therein, and a valve element 118 which is reciprocable in the valve cylinder. The valve cylinder is provided with a pair of axially spaced ports 119 and 120 which communicate, respectively, with the conduits 88 and 28. The valve casing is also provided with a pair of exhaust ports 121 and 122, which are connected by a passage 123 formed in the casing, and which communicate with the reservoir 91 through a conduit 124. When the valve member is in the position shown in Figs. 1 and 7, the conduit 88 is connected with the conduit 28 so that motive fluid will be supplied to the cylinder 22. When the valve element 118 is moved upwardly in the valve cylinder the conduit 88 is connected with the reservoir 91 through the exhaust port 121, the passage 123 and the conduit 124, and the conduit 28 is placed in communication with the reservoir through ports 120 and 122, and the conduit 124, to thereby relieve the pressure of fluid in the conduits 28, 38 and 88, and in the various cylinders communicating therewith.

The valve element 118 of the control valve is preferably connected with the pedal 71 by the link 72 so that the control valve will be actuated simultaneously with the actuation of the clutch lever 69. With this arrangement it will be seen that when the pedal is depressed to the full line position shown in Fig. 1, the clutch element 67 will be shifted into engagement with the clutch element 66 to cause actuation of the pump 30 by the electric motor 46 and, at the same time, the valve element 118 will be moved downwardly to the position shown in Fig. 7, to place the discharge conduits 38 and 88 in communication with the power cylinder 22. If desired a compression spring 125 may be provided in the valve cylinder 117 for normally moving the valve element upwardly to its exhaust position, or in other words, to the position establishing communication between the conduit 88 and exhaust port 121, and between the conduit 28 and the exhaust port 122. This spring may also assist in shifting the clutch element 67 out of engagement with the clutch element 66, and in moving the pedal to released position indicated in dotted lines in Fig. 1. In addition to the spring 125, it may be desirable to provide positive means to cause disengagement of the clutch element 67 and to shift the valve element to the exhaust position. In Figs. 1 and 8 of the drawings, I have shown such positive means in the form of a cam 126 which is secured to the drive shaft 61, and which cooperates with a lever 127 secured to the rock shaft 70. Should the operator neglect to remove his foot from the pedal 71 at the completion of a test, the cam 126 will cause the rock shaft 70 to be actuated after the cam 52 has completed one revolution, thereby providing a means for stopping the pump 30 after each piece has been tested.

For maintaining the system fully charged with fluid it may be desirable to provide a conduit 128 which connects the reservoir 91 with the conduit 36. The escape of fluid pressure to the reservoir through the conduit 128 during a test, may be prevented by providing a suitable check valve 129 in this conduit.

In order to insure the cylinder 33 being full of fluid at the beginning of the downward stroke of the plunger 43, it may be desirable to provide a vent passage 130 which connects the top of the cylinder 33 with the cylinder 32 to permit the escape of air which may collect under the plunger 43. To prevent air from being trapped in the cylinder 32 and retarding the downward movement of the plunger 42, I provide a vent passage 131 through the wall of the casing 31. Since a small amount of the fluid of the system may escape through the vent passages 130 and 131 with the air, it may be desirable to provide a drain connection 132 for the vent passage 131.

To prevent the lower end of the plunger 42 from striking the bottom of the cylinder 32 with a jarring action, it may be desirable to provide a cushion spring 134 between the cover 34 and the plate 47 of the movable weight 45. This spring is preferably positioned around the rod 44 with its lower end in engagement with the upper surface of cover 34, the section 49 of the movable weight 45 being provided with recess 135 to accommodate the upper end of the spring.

In the operation of my improved testing machine, the operator places a body to be tested upon the mandrel 13 and depresses the pedal 71 to the position shown in Fig. 1. This downward movement of the foot pedal causes the clutch element 67 to be shifted to establish a driving connection between the motor 46 and the cam 52, and also causes the valve element 118 to be moved downwardly in the casing 116, to the position shown in Fig. 7, to thereby place the fluid supply means 11 in communication with the power cylinder 22. As the cam 52 is rotated, the weight 45 is lifted against the action of gravity, and at the same time, the plunger 42 is moved upwardly in the cylinder 32 to deliver a preliminary supply of motive fluid to the power cylinder 22 at a relatively rapid rate. This preliminary supply of motive fluid causes the piston 21 to move downwardly against the action of the spring 25 at a relatively rapid rate, thereby bringing the distorting member 14 into engagement with the piece to be tested. The engagement with the test piece resists further movement of the distorting member causing the pressure of the preliminary motive fluid supply to increase. A very slight increase in the pressure of this fluid supply causes the plunger 105 of the electric contact device 102 to be moved upwardly against the action of the spring 108 to bring the contact 110 into engagement with the contact 111. The closing of these contacts energizes the electromagnet 95 causing the gauge operating member 101 to be attracted and thereby rendering the gauge 94 responsive to further movement of the impression member. The pressure of the preliminary supply of motive fluid is prevented from increasing above the pressure value required to operate the electrical contact device 102, by means of the pressure regulating device 41 which allows some of the fluid discharged from the cylinder 32 to be returned to the reservoir 91 through the conduit 99.

Continued rotation of the cam 52 allows the weight 45 to descend thereby moving the plunger 43 downwardly in the cylinder 33 and delivering motive fluid to the power cylinder 22 to cause the member 14 to distort the test piece. The rate of downward movement of the weight is regulated by the curved surface 92 of the cam to thereby maintain the downward movement of the contact member at a slow but uniform rate. The gauge 94 being connected with the member 14 through the electromagnet 95 registers or indicates the extent of movement of this member during the distortion of the test piece. Since, at the time that the distorting movement of the member 14 ceases, the full load of the weight 45, representing a predetermined value, will have been imposed on the test piece, it will be seen that the force exerted on the contact member 14 is a predetermined value, dependent upon the mass of the movable weight. When the gauge pointer comes to rest after the full load of the weight 45 has been imposed on the member 14, the operator notes the position of the pointer which now indicates the extent of penetration or distortion of the test piece and may be regarded as a direct indication of the hardness or other characteristic of the material being tested.

In Fig. 9 of the drawings I have shown another control for the distortion measuring means applied to a testing machine 135 which, as to construction and operation, is otherwise similar to the testing machine disclosed in Figs. 1 to 8. This machine is provided with a power cylinder 136 having a piston 137 therein for actuating a contact member or test member. Motive fluid, under pressure, is supplied to the cylinder 136 through a conduit 138 from a suitable source, such as the fluid supply means disclosed in connection with Figs. 1 to 8.

For measuring the distortion or penetration of the test piece by the test member, I provide a suitable gauge such as the depth gauge 139, which may be similar to the gauge 94 of Fig. 2, and which may be mounted upon the bracket 140. This gauge is provided with an elongated actuating member 141 which extends downwardly between the bracket and the movable electromagnet 142. This electromagnet is connected for movement with the piston 137 by a connecting rod 143, and is provided with a movable plate 144 which is normally frictionally pressed against the gauge actuating member 141 by means of a resilient body contained in the electromagnet. Although this resilient body may be of rubber or other suitable material, I prefer to employ a resilient body in the form of the coil spring 145. The plate 144 is constructed of magnetic material so as to respond to energization of the electromagnet 142, and is mounted on or connected to the casing of the electromagnet for movement therewith as the latter is actuated by the piston 137. The connection between the plate and the casing of the electromagnet is a loose connection to permit lateral movement of the plate for co-operation with the gauge actuating member 141.

The electromagnet may be energized from any suitable source of current, such as the storage battery 146. The circuit for this electromagnet includes a normally open limit switch 147 and a second control switch in the form of a pair of normally closed contact members 148 and 149. The limit switch is associated with a foot lever 150 which is operably connected with a fluid control valve and with a clutch mechanism, such as the control valve and clutch mechanism illustrated in Figs. 1 to 8, by means of a connecting link 151. The limit switch 147 is so positioned relative to the pedal that when the latter is depressed by the operator in making a test, the limit switch will be closed, and when the pedal is released by the operator at the completion of the test, the limit switch will be automatically opened.

The contact 148, of the normally closed control switch, is carried by the stem 152 of a fluid pressure responsive plunger 153. This plunger is reciprocably mounted in a cylinder 154 which communicates with the fluid supply line 138. Upward movement of the plunger, by the pressure of the motive fluid being supplied to the cylinder 136, is opposed by a coil spring 155 which normally holds the contact member 148 in engagement with the stationary contact 149. The latter contact is mounted upon the cover of the cylinder 154 but is insulated therefrom by a suitable bushing 156. One terminal of the electromagnet is connected to the contact 149 by a conductor 157, and the other terminal of the electromagnet is connected to the normally open limit switch 147 by a conductor 158. The terminals of the battery 146 are connected respectively to the contact member 148 and the limit switch 147 by conductors 159 and 160.

In the operation of the arrangement just described the operator inserts a test piece into the machine and then depresses the pedal 150. This movement of the pedal operates the clutch of the fluid supply means and shifts the control valve in the fluid supply line 138. This same downward movement of the pedal also closes the limit switch 147 causing the electromagnet 142 to be energized from the battery 146. Energization of this electromagnet causes the movable plate 144 to be attracted toward the core of the electromagnet and thereby moved away from the gauge actuating member 141 in opposition to the spring 145. This movement of the plate 144 causes the gauge actuating member to be released, or in other words, to be disconnected from the piston 137.

As pressure fluid is supplied to the cylinder through the conduit 138, the piston 137 is moved downwardly causing the test member to be brought into engagement with the test piece. As the pressure of the motive fluid supply is increased, the test member is pressed into, or otherwise distorts, the test piece. It should be stated at this point that the spring 155 and the cross sectional area of the plunger 153 are so proportioned that the plunger is not moved by the pressure of the preliminary supply of motive fluid which causes the test member to be initially moved into engagement with the test piece, but upon an increase in the pressure of the motive fluid supply, incident to the resistance which the test piece offers to the downward movement of the test member, the plunger 153 is moved upwardly against the action of spring 155 to move the contact member 148 away from the contact member 149. The separation of these contacts opens the circuit of the electromagnet and allows the plate 144 to be pressed against the gauge actuating member 141 by the spring 145. As the test member moves downwardly under the increased pressure of the motive fluid to distort the test piece, the electromagnet 142 is also moved downwardly and the gauge 139 is actuated by a corresponding downward movement of the member 141 as the latter is frictionally carried along with the plate 144.

When the pointer of the gauge 139 comes to rest the operator notes the position of the pointer, which furnishes him a direct indication of the extent of penetration or other distortion of the body being tested. The subsequent decrease in the pressure of the motive fluid supply allows the plunger 153 to be moved downwardly by the spring 155 causing the contact 148 to engage the contact 149 and thereby again close the circuit for the electromagnet 142. The energization of this magnet attracts the plate 144 and releases the gauge actuating member 141 allowing the pointer of the gauge to return to its zero position.

A subsequent upward movement of the pedal 150, which may be effected by a throw-out cam such as the cam 126 of the clutch mechanism illustrated in Figs. 1 to 8, allows the limit switch 147 to be opened to again deenergize the electromagnet 142, thereby placing the machine in readiness for the next test.

It should now be readily understood from the foregoing description and accompanying drawings that I have provided a novel and improved form of testing machine which is of very simple construction, but which is, nevertheless, reliable and accurate in operation. It will be seen that in my testing machine the impression member is initially moved into engagement with the test piece, at a relatively rapid rate, and is subsequently actuated to distort the test piece at relatively slow but uniform rate by novel motive fluid supply means including a weight movable under the action of gravity. It will also be seen that I have provided novel means for accurately measuring the penetration or distortion of the test piece, as well as novel means for controlling the operation of the machine so that individual pieces may be tested in rapid succession by unskilled persons.

While I have illustrated and described the apparatus of my invention in a detailed manner, it should be understood, however, that I do not intend to limit myself to the precise details of construction and arrangements of parts illustrated and described, but regard my invention as including such changes and modifications as do not involve a departure from the spirit of the invention and the scope of the appended claims.

Having thus described my invention, I claim:

1. In hardness testing apparatus of the character described the combination of relatively movable cooperating members for engagement with a test piece including a penetrator adapted to be pressed into the test piece, means including a movable weight for applying a force to one of said members to cause said penetrator to distort said piece, an indicator, and electromagnetic means for rendering said indicator responsive to relative movement between said members.

2. In hardness testing apparatus of the character described the combination of relatively movable cooperating members for engagement with a test piece including a penetrator adapted to be pressed into the test piece, means including a movable weight for applying a force to one of said members to cause said penetrator to distort said piece, an indicator, electromagnetic means for rendering said indicator responsive to relative movement between said members, and means controlling the rate of movement of said weight to thereby regulate the velocity of said relative movement.

3. In testing apparatus of the character described the combination of a test piece support, a movable contact member adapted to engage said test piece, means including a movable weight for applying a force to said movable member to distort said test piece, an indicator having a movable control element, and an electromagnet for connecting said control element with said contact member to thereby render said indicator responsive to movement of the contact member.

4. In testing apparatus of the character described the combination of a test piece support, a movable contact member adapted to engage said test piece, means including a movable weight for applying a force to said movable member to distort said test piece, an indicator having a movable control element, an electromagnet for connecting said control element with said contact member to thereby render said indicator responsive to movement of the contact member, and means for controlling the rate of movement of said weight to thereby regulate the rate of travel of said contact member.

5. In testing apparatus of the character described the combination of a test piece support, a movable contact member adapted to engage said test piece, means including a weight movable by gravity for applying a force to said movable member to distort said test piece, an indicator, electromagnetic means for rendering said indicator responsive to movement of said member during distortion of said test piece, and means including a manually operable member for moving said weight in opposition to gravity.

6. In testing apparatus of the character described the combination of a test piece support, a movable contact member adapted to engage said test piece, means including a weight movable by gravity for applying a force to said movable member to distort said test piece, an indicator, electromagnetic means for rendering said indicator responsive to movement of said member during distortion of said test piece, power means including a clutch for moving said weight in opposition to gravity, and a control for said clutch.

7. In testing apparatus of the character described the combination of a test piece support, a movable contact member adapted to engage said test piece, means including a weight movable by gravity for applying a force to said movable member to distort said test piece, an indicator, electromagnetic means for rendering said indicator responsive to movement of said member during distortion of said test piece, means for lifting said weight in opposition to gravity, and manually operable control means common to the force applying means and to said lifting means.

8. In testing apparatus of the character described the combination of a support for a test piece, a contact member for engagement with said test piece, means for causing relative movement between said contact member and said support to distort said test piece including a piston and a cylinder for said piston, means for supplying motive fluid to said cylinder at a preliminary pressure value, an indicator, means responsive to said preliminary pressure value of the fluid for rendering said indicator responsive to said relative movement, and means including a weight movable by gravity for supplying motive fluid to said cylinder at a pressure in excess of said preliminary pressure during the distortion of said test piece.

9. In testing apparatus of the character described the combination of a support for a test piece, a contact member for engagement with said test piece, means for causing relative movement between said contact member and said support to distort said test piece including a piston and a cylinder for said piston, means for preliminarily supplying motive fluid to said cylinder, means responsive to fluid pressure for rendering said supplying means ineffective to cause distortion of said test piece during the preliminary supply of motive fluid, means including a weight movable by gravity for subsequently supplying motive fluid to said cylinder at a pressure in excess of the pressure of the preliminary supply, and means for measuring the relative movement produced by the increased fluid pressure.

10. In testing apparatus of the character described the combination of a support for a test piece, a contact member for engagement with said test piece, means for causing relative movement between said contact member and said support including a piston and a cylinder for said piston, means for preliminarily supplying motive fluid to said cylinder, an indicator, means responsive to a pressure value of the preliminary motive fluid supply for rendering said indicator responsive to said relative movement, means for preventing the pressure of the preliminary fluid supply from exceeding a predetermined value, and means including a weight movable by gravity for supplying motive fluid to said cylinder at a pressure in excess of said predetermined value to distort said test piece.

11. In testing apparatus of the character described the combination of a contact member adapted to engage a piece to be tested, means for actuating said contact member to distort said test piece including a piston and a cylinder for said piston, means for measuring movement of said contact member during distortion of the test piece, and means for supplying motive fluid to said cylinder at a substantially uniform rate during said distortion, the last mentioned means comprising a second cylinder operatively connected with the first mentioned cylinder, a plunger in said second cylinder, a movable weight for actuating said plunger in one direction, and means for moving said weight and plunger in an opposite direction.

12. In testing apparatus of the character described the combination of a contact member adapted to engage a piece to be tested, means for actuating said contact member to distort said test piece including a piston and a cylinder for said piston, means for measuring movement of said contact member during distortion of the test piece, and means for supplying motive fluid to said cylinder during said distortion, the last mentioned means comprising a second cylinder operatively connected with the first mentioned cylinder, a plunger in said second cylinder, a weight movable by gravity for actuating said plunger, and means for controlling the rate of movement of said weight to thereby regulate the rate of movement of said contact member during the distortion of the test piece.

13. In testing apparatus of the character described the combination of a support for a test piece, an impression member movable relative to said support, means for applying a force to said impression member to thereby distort said test piece including a piston and cylinder for said piston, means for indicating the extent of movement of said impression member during the distortion of said test piece, and means for supplying motive fluid to said cylinder at a substantially uniform rate during said distortion, the last mentioned means comprising a second cylinder operably connected with the first mentioned cylinder, a plunger in said second cylinder, a weight movable by gravity for actuating said plunger, power means for lifting said weight against the action of gravity, and means associated with said power means for controlling the gravitational movement of said weight to thereby regulate the rate of movement of said impression member.

14. In testing apparatus of the character described the combination of a support for a test piece, an impression member movable relative to said support, means for applying a force to said impression member to thereby distort said test piece including a piston and cylinder for said piston, means for indicating the extent of movement of said impression member during the distortion of said test piece, and means for supplying motive fluid to said cylinder during said distortion the last mentioned means comprising a second cylinder, a conduit connecting said cylinders, a valve in said conduit, a plunger in said second cylinder, a weight movable by gravity for actuating said plunger, power means including a clutch for lifting said weight against the action of gravity, and common control means for actuating said valve and said clutch.

15. In testing apparatus of the character described the combination of a test piece support, a contact member adapted to be applied to a test piece, means for moving said contact member relative to said support including a piston and a power cylinder for said piston, and means for supplying motive fluid to said cylinder to actuate said piston, the last mentioned means comprising a pair of fluid supply cylinders operatively connected with said power cylinder, one of said supply cylinders being of relatively large diameter to cause an initial rapid movement of said contact member into engagement with the test piece and the other being of relatively small diameter to cause a subsequent slow movement of the contact member to distort the test piece, means for measuring movement of said contact member during distortion of said test piece, a pair of plungers operable in said supply cylinders for delivering motive fluid therefrom, a weight connected to said plungers and movable by gravity for actuating the plunger of the relatively small diameter cylinder, and means for lifting said weight against the action of gravity and simultaneously actuating the plunger of the relatively large diameter cylinder.

16. In testing apparatus of the character described the combination of a test piece support, a contact member adapted to be applied to a test piece, means for moving said contact member relative to said support including a piston and a power cylinder for said piston, and means for supplying motive fluid to said cylinder to actuate said piston, the last mentioned means comprising a pair of fluid supply cylinders operatively connected with said power cylinder, one of said supply cylinders being of relatively large diameter to cause an initial rapid movement of said contact member into engagement with the test piece and the other being of relatively small diameter to cause a subsequent slow movement of the contact member to distort the test piece, means for measuring movement of said contact member during distortion of said test piece, a pair of plungers operable in said supply cylinders for delivering motive fluid therefrom, a weight connected to said plungers and movable by gravity for actuating the plunger of the relatively small diameter cylinder, means for lifting said weight against the action of gravity and simultaneously actuating the plunger of the relatively large diameter cylinder, and means associated with said lifting means for controlling the gravitational movement of said weight to thereby regulate the rate of movement of the contact member during distortion of the test piece.

17. In testing apparatus of the character described the combination of a contact member for engagement with a piece to be tested, means for actuating said contact member to distort said test piece including a piston and a cylinder for said piston, means for measuring movement of said contact member during distortion of said test piece, and means for supplying motive fluid to said cylinder at a substantially uniform rate during said distortion, the last mentioned means comprising a body having a vertically extending cylinder therein operably connected with the first mentioned cylinder, a plunger in the second mentioned cylinder, a weight connected to said plunger with the center of gravity of the weight substantially on the axis of said second mentioned cylinder, a rotatable power shaft, a cam driven by said shaft, and means cooperating with said cam for moving said weight in the direction of said axis in opposition to the force of gravity.

18. In testing apparatus of the character described the combination of a contact member for engagement with a piece to be tested, means for actuating said contact member to distort said test piece including a piston and a cylinder for said piston, means for measuring movement of said contact member during distortion of said test piece, and means for supplying motive fluid to said cylinder at one rate prior to the distortion of the test piece by said contact member and at a different rate during distortion of said test piece, the last mentioned means comprising a body having therein a pair of axially aligned vertical supply cylinders operably connected with the first mentioned cylinder, plungers in said cylinders, a weight connected to said plungers with the center of gravity of the weight substantially on the axis of said supply cylinders, and means for moving said weight in the direction of said axis in opposition to the force of gravity.

19. In testing apparatus of the character described the combination of a contact member for engagement with a piece to be tested, means for moving said contact member into engagement with said test piece including a piston and a cylinder for said piston, a motive fluid supply cylinder, a conduit connecting said supply cylinder with the first mentioned cylinder, and means in said conduit for preventing the pressure of the motive fluid from exceeding a predetermined value, the last mentioned means comprising a body having a pressure relief passage therein and a passage normally connecting said supply cylinder with said conduit and thereby with said first mentioned cylinder, and means responsive to the pressure of the motive fluid for opening said relief passage and at substantially the same time closing the connecting passage of said body.

20. In testing apparatus of the character described the combination of a contact member for engagement with a piece to be tested, means for moving said contact member into engagement with said test piece including a piston and a cylinder for said piston, a motive fluid supply cylinder, a conduit connecting said supply cylinder with the first mentioned cylinder, and means in said conduit for preventing the pressure of the motive fluid from exceeding a predetermined value, the last mentioned means comprising a body having a cylinder therein in communication with said conduit, said body also having a pressure relief passage therein and a passage normally connecting said supply cylinder with said conduit and thereby with said first mentioned cylinder, and a fluid pressure responsive plunger movable in said cylinder for closing the connecting passage of said body and establishing communication between said conduit and said relief passage.

21. In testing apparatus of the character described the combination of a contact member for engagement with a piece to be tested, means for actuating said contact member including a piston and a cylinder for said piston, and means for supplying motive fluid to said cylinder, the last mentioned means comprising a fluid supply cylinder of relatively large diameter, a fluid supply cylinder of relatively small diameter, a conduit for delivering motive fluid to the first mentioned cylinder from said supply cylinders, said conduit having branches connected to said supply cylinders, and a check valve in the branch connected to the large diameter supply cylinder.

22. In testing apparatus of the character described the combination of a contact member for engagement with a piece to be tested, means for actuating said contact member including a piston and a cylinder for said piston, and means for supplying motive fluid to said cylinder, the last mentioned means comprising a pair of substantially axially aligned supply cylinders including a low pressure cylinder and a high pressure cylinder, a pair of connected plungers operable in said pair of cylinders, means operably connected with said plungers for actuating the same in one direction to discharge fluid from the low pressure cylinder and in the opposite direction to discharge fluid from the high pressure cylinder, and means for preventing air from being trapped in the high pressure cylinder of said pair during the discharge of fluid therefrom.

23. In testing apparatus of the character described the combination of a contact member for engagement with a piece to be tested, means for actuating said contact member including a piston and a cylinder for said piston, and means for supplying motive fluid to said cylinder, the last mentioned means comprising a pair of substantially axially aligned supply cylinders, a pair of connected plungers operable in said pair of cylinders, a weight operably connected with said plungers and movable by gravity for causing a delivery stroke of one of said plungers, and means for moving said weight in opposition to gravity and at the same time causing a delivery stroke of the other of said plungers.

24. In testing apparatus of the character described the combination of a contact member for engagement with a piece to be tested, means for actuating said contact member including a piston and a cylinder for said piston, and means for supplying motive fluid to said cylinder, the last mentioned means comprising a pair of substantially axially aligned supply cylinders, a pair of connected plungers operable in said pair of cylinders, a weight operably connected with said plungers and movable by gravity for causing a delivery stroke of one of said plungers, and means including a movable cam for lifting said weight and at the same time causing a delivery stroke of the other of said plungers, said cam having a means thereon for regulating the rate of downward movement of said weight.

JOSEPH GOGAN.